Feb. 14, 1933.      R. S. BAILEY ET AL      1,897,104
SIGNALING SYSTEM
Filed June 28, 1932

INVENTORS
R.S. Bailey and
BY H.F. Shoffstall
ATTORNEY

Patented Feb. 14, 1933

1,897,104

UNITED STATES PATENT OFFICE

RAND S. BAILEY, OF GLEN RIDGE, AND HUGH F. SHOFFSTALL, OF MAPLEWOOD, NEW JERSEY, ASSIGNORS TO AMERICAN TELEPHONE & TELEGRAPH COMPANY, A CORPORATION OF NEW YORK

SIGNALING SYSTEM

Application filed June 28, 1932. Serial No. 619,796.

This invention relates to signaling systems, and, more particularly, to those systems in which means are provided for changing the normal connections of such systems by means of cords and plugs or the like, or for removing therefrom or adding thereto particular units of apparatus or parts of the system as are required, for example, for testing purposes.

Where such features are desired, it is the usual practice to provide jacks in the transmission circuits at those points in the circuits where the connections are to be changed whenever necessary or where tests are to be made. These jacks are usually arranged so that the desired connection to the transmission circuits may be accomplished by inserting suitable plugs equipped with cords into these jacks. When it is necessary to connect testing or other apparatus to only one of the circuits, normally closed contacts are sometimes embodied in the physical structures of the jacks themselves and these are connected in series with the transmission or signaling circuits and they are arranged so that the act of inserting the plug opens these contacts, thereby disconnecting the remaining portions of the circuits.

Jacks which may satisfactorily accomplish this purpose must be of rugged construction and, because of their inclusion of a number of normally closed contacts, they must necessarily occupy considerable space. Where a large number of circuits must be accommodated at one point in the circuits, it may not be possible to make all of the jacks conveniently accessible to the operator at that point. Furthermore, the openings of the jacks permit the accumulation of dust on the jack springs and this is known to interfere with the proper functioning of the normally closed contacts.

One of the objects of the invention is to provide circuit arrangements whereby jacks which have comparatively small dimensions and do not have normally closed contacts may be used in association with relays for the purposes described above. Another object of the invention is to provide jacks which do not have normally closed contacts, in association with relays to provide means for securing greater freedom from dust accumulations on the contacts of the transmission circuits. A further object of the invention is to provide means whereby jacks provided for testing or other purposes may be remotely located with respect to the normal location of the transmission circuits to be tested without appreciable effect on the electrical characteristics of the circuits.

Figure 1:
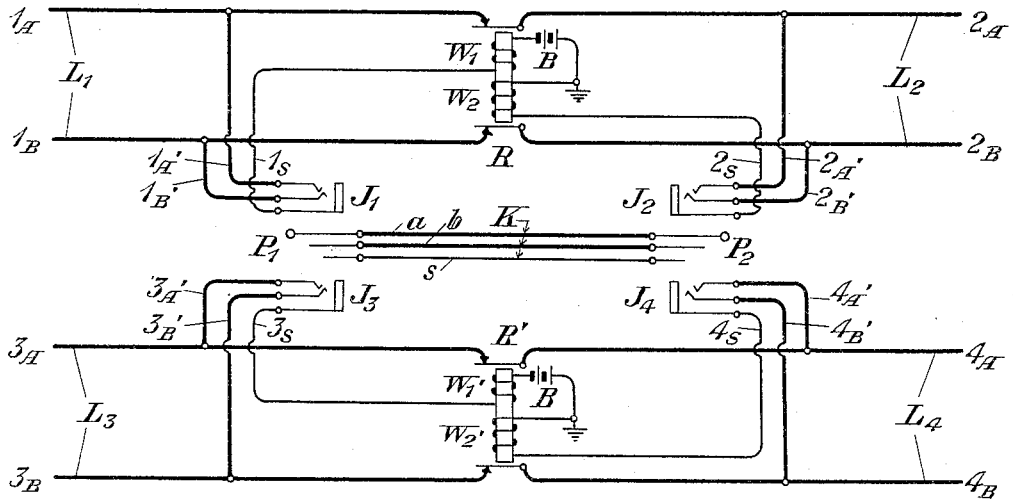
Figure 2:
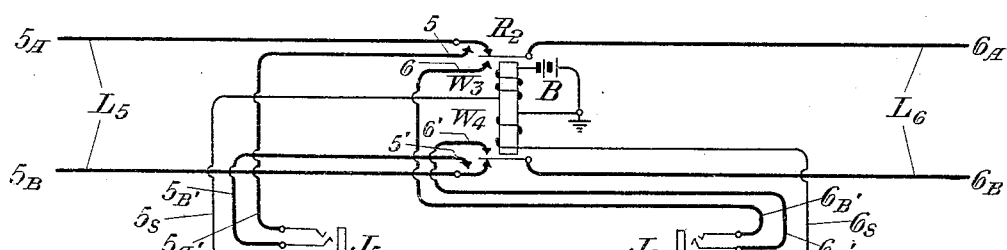
Figure 3:
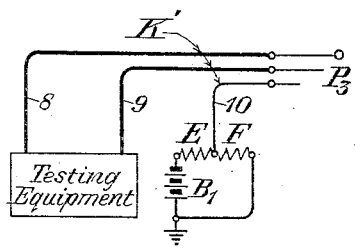
Figure 4:
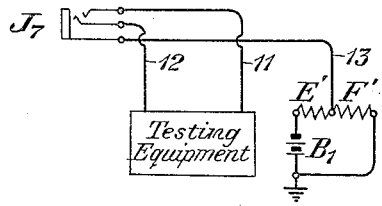

Other objects will be understood from the following detailed description of the invention and the accompanying drawing, in which Figures 1 and 2 show transmission circuits to which the invention has been applied, and Figs. 3 and 4 show testing equipment which may be connected to the circuits of Figs. 1 and 2.

In Fig. 1 there are shown two transmission lines $L_1$ and $L_2$ arranged in accordance with one embodiment of the invention. Conductors 1A and 1B of line $L_1$ are normally connected to conductors 2A and 2B, respectively, of line $L_2$ through the two armatures and the normally closed contacts of relay R. Associated with line $L_1$ is a jack $J_1$ which has its springs normally connected to line $L_1$ over conductors 1A' and 1B'. Similarly, a jack $J_2$ associated with line $L_2$ has its springs normally connected to line $L_2$ over conductors 2A' and 2B'. The relay R has two separate windings supported on a common core and these are designated $W_1$ and $W_2$. One terminal of the upper winding $W_1$ is connected to a grounded battery B, and the other terminal of the upper winding is connected to the sleeve of jack $J_1$ over conductor 1S. One terminal of the lower winding $W_2$ is connected to ground and the other terminal is connected to the sleeve of jack $J_2$ over conductor 2S.

Two lines $L_3$ and $L_4$, which are similar to lines $L_1$ and $L_2$, respectively, are shown in the lower part of Fig. 1. Lines $L_3$ and $L_4$ are connected through the two armatures and the normally closed contacts of relay R' and have associated with them jacks $J_3$ and $J_4$. Jacks $J_3$ and $J_4$ are connected to the lines $L_3$ and $L_4$ in the same manner as are the jacks $J_1$ and $J_2$ and the lines $L_1$ and $L_2$, previously described, and this description need not be repeated. Between the two circuits is shown a cord K having 3 conductors designated A, B and S, and equipped at each end with plugs designated $P_1$ and $P_2$, as shown, and these plugs are adapted to cooperate with any of the jacks already described.

The circuits just described may operate in any well-known manner. For example, currents or signals may emanate from a source connected to line $L_1$, flow over line $L_1$, over the back contacts of the armatures of relay R and over the line $L_2$ to, for example, a receiving device or apparatus connected or coupled to line $L_2$. Similarly, currents or signals may flow from another source over $L_3$ and $L_4$ to a device or apparatus connected or coupled to line $L_4$.

Suppose that it is now desired to disconnect line $L_2$ from line $L_1$, as might be required if line $L_2$ becomes inoperative, and that it is desired to establish positive connection from line $L_1$ over line $L_4$. Plug $P_1$ or $P_2$ of cord K will then be inserted in jack $J_1$ associated with line $L_1$ and the other plug of the cord will be inserted in jack $J_4$ associated with line $L_4$. When these connections are completed, current will flow from battery B over the winding $W_1$ of relay R, over conductor 1S to the sleeve of jack $J_1$, then over the sleeve of the plug inserted in jack $J_1$, over conductor S of cord K, over the sleeve of the plug inserted in jack $J_4$, over the sleeve of jack $J_4$, over conductor 4S, through the winding $W'_2$ of relay R', over ground and back to battery B. Relays R and R' will both operate.

The operation of relay R disconnects line $L_2$ from line $L_1$ by opening the back contacts of the armatures of this relay. The operation of relay R' similarly disconnects line $L_4$ from line $L_3$. At the same time the transmission circuit is established from line $L_1$ over conductors 1A' and 1B', over the springs of jack $J_1$, over the conductors A and B of cord K, over the springs of jack $J_4$, and over the conductors 4A' and 4B' to line $L_4$. When either of the plugs of cord K is removed from the jack in which it is inserted after the connection just described has been established, the circuit for operating relays R and R' will be simultaneously broken, thereby releasing these relays and reestablishing their original connections.

A similar connection may be established between line $L_3$ and line $L_2$ by inserting plugs of a cord (not shown) similar to cord K in jacks $J_3$ and $J_2$ and such connection may be made at the same time as that between lines $L_1$ and $L_4$, or it may be made independently, if so desired. In the latter case, a circuit for operating relays R and R' is completed over the sleeve conductor of the associated cord so that these relays will operate and thereby disconnect line $L_4$ from line $L_3$ and similarly disconnect line $L_1$ from line $L_2$ in the manner previously described.

It is desirable to locate the various jacks so that they may be conveniently engaged by the plugs of one or more cords similar to the one designated K and it may not always be practicable to locate the various relays adjacent to the jacks. If the distance between these jacks and relays becomes too great, the capacity between the conductors such as 1A' and 1B' of Fig. 1, which are bridged across the line $L_1$, may have detrimental effects on the electrical characteristics. Fig. 2 shows an arrangement to overcome such effects.

In Fig. 2 the conductors 5A and 5B forming line $L_5$ are normally connected to conductors 6A and 6B, respectively, forming line $L_6$, the connection being established through the normally closed contacts and armatures of relay $R_2$. Associated with lines $L_5$ and $L_6$ are jacks $J_5$ and $J_6$, respectively, which have their sleeve members connected, respectively, to the windings $W_3$ and $W_4$ of relay $R_2$ in the manner previously described. The springs of jack $J_5$ are connected to the normally open contacts 5 and 5' of relay $R_2$ over conductors 5A' and 5B' and the springs of jack $J_6$ are connected to the normally open contacts 6 and 6' of relay $R_2$ over conductors 6A' and 6B'. Consequently, the capacity between conductors 5A' and 5B' or between conductors 6A' and 6B' will have no effect on the electrical characteristics of lines $L_5$ and $L_6$ under normal conditions.

If a cord, such as cord K, shown in Fig. 1, establishes a connection between jack $J_5$ and another jack, such as $J_6$, an operating circuit will be completed for relay $R_2$ over the sleeve conductor of the cord so that relay $R_2$ will be operated. The circuit completed will include the battery B, the upper winding of relay $R_2$, the sleeve of jack $J_5$, the sleeve contacts and conductor of the cord, the sleeve of jack $J_6$, the lower winding of relay $R_2$ and ground. The operation of relay $R_2$ will disconnect line $L_6$ from line $L_5$ by the opening of its outer contacts. At the same time, contacts 5 and 5' of relay $R_2$ will become closed, thereby connecting conductors 5A and 5B of line $L_5$ to the springs of jack $J_5$ over conductors 5A' and 5B'. Also, contacts 6 and 6' of relay $R_2$ will become closed, thereby connecting conductors 6A and 6B of line $L_6$ to the springs of jack $J_6$ over conductors 6A' and 6B'. It is thus evident that a transmission circuit may be established from line $L_5$, or from any one of a plurality of lines receiving currents or signals, of which $L_5$ is the only one shown, over a cord, such as cord K of Fig. 1, to any one of a plurality of lines, only one of which is shown and designated line $L_6$, practically in the same way as described hereinabove for Fig. 1. (Obviously, a transmission circuit may also be established in the same manner from line $L_5$ to any line such as $L_2$ or $L_4$ of Fig. 1 or from line $L_6$ to any line such as $L_1$ or $L_3$ of Fig. 1.)

It will be noted that in each of the above arrangements the contacts, which are included in the transmission circuit for disconnecting the parts of the circuit when connections are to be changed, are located on relays, and these relays can be constructed to give any desired degree of freedom from dust accumulations on the contacts by any of the methods well known in the art. For purposes of testing the transmission circuits or any parts thereof or of the apparatus associated therewith, testing apparatus may be provided and connected as shown either in Fig. 3 or Fig. 4. In the arrangement of Fig. 3 the testing apparatus, which may be of any well-known type, is connected to the tip and ring contacts of the plug $P_3$ over conductors 8 and 9 of the cord K'. The sleeve member of plug $P_3$ is connected over conductor 10 to the junction of two resistances E and F, the other terminals of which are connected in series with a battery B, one terminal of which is grounded. Plug $P_3$ is located so that it may be connected directly to any one of the various jacks of the several transmission circuits shown in Figs. 1 and 2. If it is desired to make a test on a line such as $L_1$, plug $P_3$ will be inserted in jack $J_1$ which is associated with line $L_1$. Current will then flow from battery B, through winding $W_1$ of relay R, conductor 1S, the sleeve of jack $J_1$, the sleeve member of plug $P_3$, conductor 10, and resistance F to ground. Current will also flow continuously from battery $B_1$ shown in Fig. 3, through resistances E and F. By virtue of the grounding of one side of battery $B_1$, the winding $W_1$ of relay R will be in parallel relation to resistance E and the resulting increased current flow in winding $W_1$ will be sufficient to operate relay R.

The operation of relay R disconnects line $L_2$ from line $L_1$ so that the presence of line $L_2$ will not interfere with the testing of line $L_1$. At the same time, a connection will be completed from the testing equipment shown in Fig. 3 over conductors 8 and 9 of cord K', over the tip and ring sides of plug $P_3$, over the springs of jack $J_1$, and over the conductors 1A' and 1B' to conductors 1A and 1B of line $L_1$.

If it is desired to test line $L_2$, plug $P_3$ will, of course, be inserted in jack $J_2$ associated with line $L_2$. Winding $W_2$ of relay R will then be in parallel relation to resistance F of Fig. 3, which will also cause the operation of relay R because of the increased current flowing through winding $W_2$. The operation of relay R disconnects line $L_1$ from line $L_2$, and the connection of the testing equipment to line $L_2$ becomes completed in the manner previously described. Obviously, the testing equipment may be used in the same manner as described for testing the lines shown in Fig. 2.

In the arrangement of Fig. 4, the testing equipment is connected to the springs of a jack $J_7$ over conductors 11 and 12. The sleeve member of jack $J_7$ is connected to the junction of two resistances E' and F', the other terminals of which are connected in series with the battery B, one terminal of which is grounded. If it is desired to test a line, such as $L_1$ shown in Fig. 1, one plug of a cord, such as cord K of Fig. 1, is inserted in jack $J_7$ and the other plug of the cord is inserted in jack $J_1$ associated with line $L_1$. A circuit is then established from battery B of Fig. 1 over the upper winding $W_1$ of relay R, over conductor 1S, conductor S of cord K, the sleeve of jack $J_7$, the conductor 13, resistance F' and ground. The winding $W_1$ of relay R will be connected in parallel relation with resistance E' and the resulting current in winding $W_1$ will be sufficient to operate relay R. The operation of relay R disconnects line $L_2$ from line $L_1$, while a connection from the testing equipment of Fig. 4 is established over conductors 11 and 12, over the springs of jack $J_7$, conductors A and B of cord K, springs of jack $J_1$ and conductors 1A' and 1B' to conductors 1A and 1B of line $L_1$. Obviously, a similar connection may be made between jack $J_7$ of Fig. 1 and a jack, such as $J_2$ of Fig. 1, associated with a line such as $L_2$, and winding $W_2$ of the relay R associated with such a line would be in parallel relation to resistance F' which would cause the operation of the relay in the manner previously described in connection with Fig. 3.

It should be understood that the lines $L_2$, $L_4$ or $L_6$ of Figs. 1 and 2 may be similar to the lines $L_1$, $L_3$ or $L_5$, respectively, to which they are normally connected or that all or some of them may represent the terminating circuit of any of the various types of apparatus, such as repeating coils, amplifiers, signaling apparatus, or various other devices that might be associated with these lines. It should also be understood that the arrangements shown in Fig. 1 or Fig. 2 may be interposed at any point or points in a transmission circuit where testing is desired or where two or more lines need to be connected, and that these arrangements may be provided on both sides of apparatus units, such as an amplifier or amplifiers, for example, or on both sides of any other portion or part of the transmission circuit to which a separate connection may be desired for testing or other purposes.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. In a signaling system, the combination of a plurality of lines each transmitting currents from its input circuit to its output circuit, a relay associated with each line having an armature normally interposed in series with the line so that the line will remain closed until the relay operates, two jacks associated with each line, one if which is connected to the input circuit of the line and the other to its output circuit, a cord equipped at each end with a plug, each plug being adapted to engage in one of said jacks, and means responsive to the insertion of one of the plugs of the cord into one of the jacks associated with the input circuit of any one of said lines and to the insertion of the other of the plugs into the jack associated with the output circuit of another of said lines for operating the relays of both lines, thereby disconnecting the input circuits of the two lines from their respective output circuits and connecting the input circuit of the first mentioned line to the output circuit of the second mentioned line.

2. The combination of two two-wire lines each having an input circuit and an output circuit, four jacks, one jack provided for one of the circuits of each two-wire line, and means including a cord having a plug at each end for connecting the input circuit of one of said lines with the output circuit of the other of said lines and for simultaneously disconnecting the input circuits of both lines from their respective output circuits.

3. The combination of a first input circuit, a first output circuit, a first relay having two armatures which connect the first input circuit with the first output circuit, a second input circuit, a second output circuit, a second relay having two armatures which connect the second input circuit with the second output circuit, and means for simultaneously operating both relays so as to disconnect the first and second input circuits from the first and second output circuits, respectively, and for connecting the first input circuit to the second output circuit.

In testimony whereof, we have signed our names to this specification this 27th day of June 1932.

RAND S. BAILEY.
HUGH F. SHOFFSTALL.